United States Patent [19]

Letendre

[11] Patent Number: 5,193,428
[45] Date of Patent: Mar. 16, 1993

[54] ASSEMBLY FOR CONVENTIONAL BENCH SAW

[76] Inventor: Michel Letendre, 2620 Croissant Bernini, Brossard, Québec, Canada

[21] Appl. No.: 801,886

[22] Filed: Dec. 3, 1991

[51] Int. Cl.⁵ .................... B27B 5/06; B27B 5/30
[52] U.S. Cl. ..................... 83/863; 83/471.1; 83/473; 83/477.2; 144/3 R
[58] Field of Search ............ 83/863, 477.2, 471.1, 83/477.1, 473, 665; 144/3 R

[56] References Cited

U.S. PATENT DOCUMENTS

| | | | |
|---|---|---|---|
| 3,905,263 | 9/1974 | Smith | 83/477.2 |
| 4,181,164 | 1/1980 | Meniconi | 144/3 R |
| 4,276,799 | 7/1981 | Muehling | 83/477.2 X |
| 4,308,777 | 1/1982 | Lawson | 83/863 X |
| 4,534,256 | 8/1985 | Benuzzi | 83/863 |
| 4,706,535 | 11/1987 | Ducharme | 83/863 |
| 5,040,444 | 8/1991 | Shiotani et al. | 83/477.2 |

Primary Examiner—Frank T. Yost
Assistant Examiner—Rinaldi Rada
Attorney, Agent, or Firm—Cushman, Darby & Cushman

[57] ABSTRACT

The disclosure herein describes an attachment assembly for mounting to a conventional bench saw; the assembly comprises a rigid member which is mounted to the power-operated main shaft of the bench saw. The member has two projecting rods at one end thereof which are adapted to engage a spring biased pin-carrying plate pivotally mounted to a movable structure of the bench saw; the function of the pins is to fixedly secure the rigid member to the movable structure after the attachment is installed and the tool fixedly set for a cutting operation. The cooperation of the projecting rods with the pins is such as to prevent vertical, lateral and angular movements of the member which would otherwise exist due to the reaction forces exerted during the cutting operation whilst permitting at all time controlled vertical and angular positioning by means of table saw handwheels.

6 Claims, 3 Drawing Sheets

ASSEMBLY FOR CONVENTIONAL BENCH SAW

FIELD OF THE INVENTION

The present invention relates to an attachment assembly for mounting to a conventional bench saw.

BACKGROUND OF THE INVENTION

Conventional bench saws comprise a base, a work-supporting table resting over the base and displaying a longitudinal opening therethrough, a movable structure mounted in the base and carrying a power-operated main shaft, a cutting tool operatively connected to the shaft and protruding through the opening, and means for causing vertical and angular displacements of the shaft-carrying structure relative to the table.

The basic assembly of these bench saws is accomplished at the manufacturing plant and their end use is strictly limited to circular sawing.

U.S. Pat. No. 4,706,535 issued Nov. 17, 1987 to Ducharme proposes a scoring saw assembly which can be installed on existing bench saws which are not equipped with a scoring saw. Such conventional bench saws are equipped with means for causing vertical and angular displacements of the power-operated shaft relative to the work-supporting table. However, the scoring saw kit described in the above U.S. patent comprises a elongated casing which is adapted for vertical displacement of the main saw blade relative to the work table but which cannot be moved angularly with the movable structure of the bench saw as the kit is fixedly secured to the work-supporting table with mean allowing only the said vertical displacement. Hence, the cutting operation on the work piece is limited only to a vertical cut and to one type of cutting, namely scoring.

In applicant's co-pending U.S. application Ser. No. 07/664,671 filed Mar. 5, 1991, there is described an attachment assembly for mounting to a conventional bench saw which comprises an elongated tool-holding member mounted to the power-driven main shaft of the bench saw, the member having, at one end, a pair of projecting rods adapted to engage a pair of guide pins mounted on a movable part of the bench saw. The positioning of the rods on the pins is accomplished initially through a sliding engagement for the installation stage until their engagement is finally secured so that, during the cutting operation, rods and pins cooperate to prevent lateral and angular movements of the elongated member. In the embodiment illustrated in the said patent application, the mounting and dismounting of the elongated member are somewhat rendered difficult and cumbersome by the particular engagement and disengagement of the rods with their respective guide pins.

OBJECTS AND STATEMENT OF THE INVENTION

It is an object of the present invention to provide an attachment assembly for mounting to a conventional bench saw which overcomes the above mounting and dismounting problems of the tool-holding member to the bench saw.

It is thus an object of the present invention to provide an attachment assembly for bench saws which allows quick and easy installation and removal of the attachment.

These objects are achieved by providing an attachment assembly which comprises:

a rigid member associated with the tool and mounted rotatively to the main shaft of the bench saw, the member extending longitudinally of the opening in the table and having projection means at one end thereof; and securing means mounted on the movable structure of the bench saw to engage and disengage the projection means; the securing means being movable between a first position whereby the projection means are free from engagement with the securing means, and a second position whereby the member is fixedly connected to the movable structure when the cutting tool is set for a cutting operation to thereby prevent vertical, lateral and angular movements of the member caused by forces exerted during the cutting operation.

In one form of the invention, the securing means are spring biased from the first position to the second position.

In another form of the invention, the projection means consist of a pair of spring rods longitudinally extending from one end of the member while the securing means consist of a pair of guides on which the rods are slidably received.

One advantage of the present invention is that a scoring saw assembly may be mounted to the power-operated main shaft of the bench saw, the scoring saw assembly consisting of a main saw blade and a scoring saw blade, both of which being vertically as well as angularly adjustable relative to the work table while permitting any movement (vertical, lateral and angular) of the member during cutting operation. Vertical and angular positioning is at all time possible with the table handwheels; this is due to the positive action of the rods between the pins.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
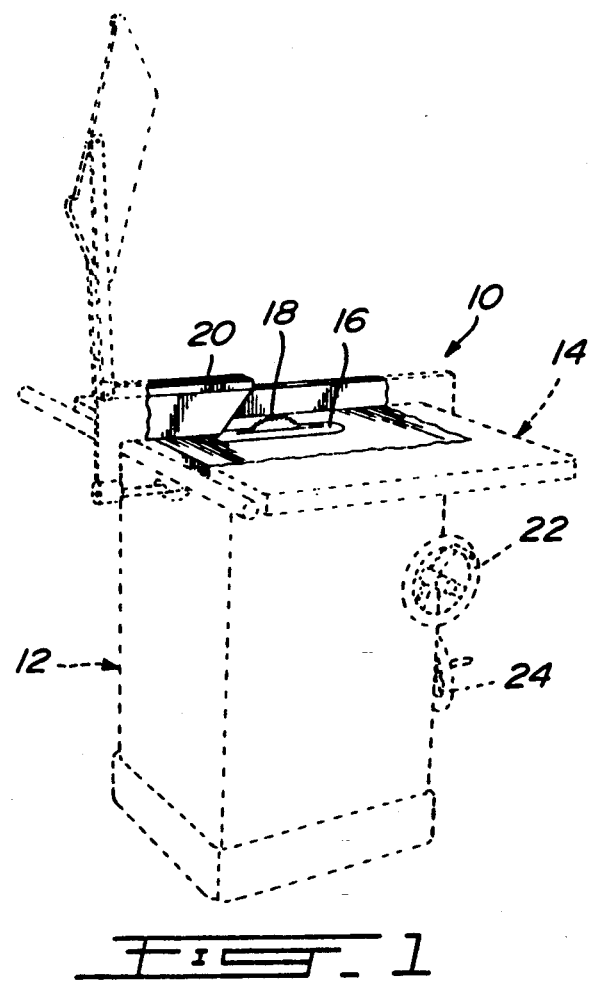
FIG. 1 is a perspective view of a conventional bench saw.

Referring to FIG. 1, there is shown a conventional bench saw, generally denoted 10, having a base 12, a work-supporting table 14 mounted over the base and displaying a longitudinal opening 16 through which protrudes a cutting tool, such as a blade saw 18. A work-piece splitter 20 is pivotally mounted over the work table. A pair of handwheels 22 and 24 are displayed adjacent two side walls of the base 12; they serve to vertically and tiltably displace and adjust the cutting tool 18 relative to the work-supporting table 14. The movable structure disposed within the bench saw to tilt the tool as well as the mechanism which provides the vertical adjustment of the tool are well known and a detailed description thereof will not be given, although parts thereof will be shown in FIGS. 2 and 3 for an understanding of the operation of the present invention.

Figure 2:
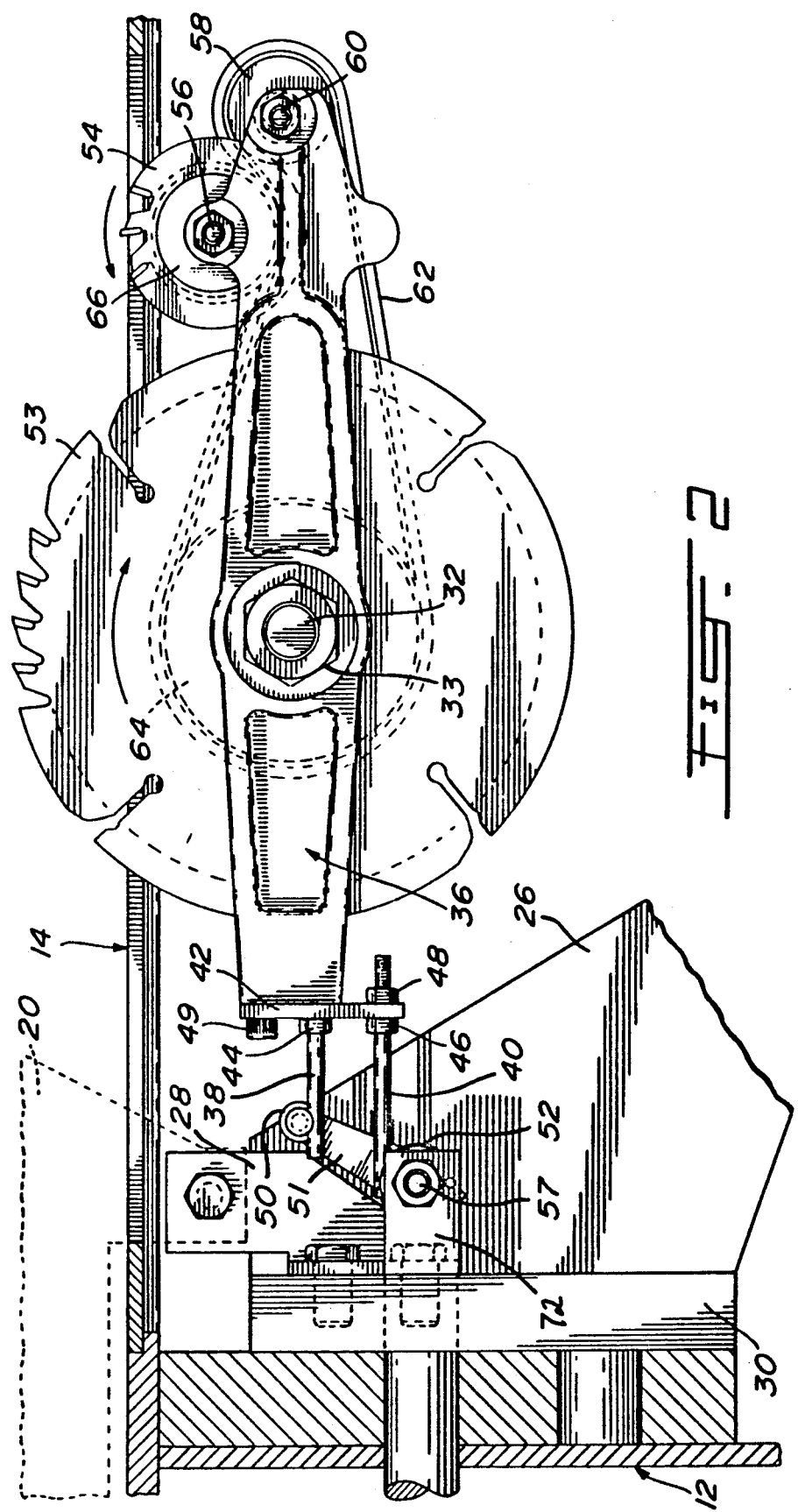
FIG. 2 is an elevational view of one embodiment of an attachment assembly made in accordance with the present invention, adapted to be mounted to a conventional bench saw and illustrating a scoring saw assembly as an example of a cutting tool.

Referring to FIG. 2, elements 26, 28 and 30 are parts of the movable structure conventionally found in existing bench saws, with the exception that element 28 has a projecting wall 72, the function of which will be described hereinbelow. Also standard in conventional bench saws is a power-operated shaft 32 which is so mounted on the movable structure as to allow vertical and angular adjustments of the tool relative to the plane of the work table 14.

Basically, the attachment assembly consists of an elongated rigid member 36 which is mounted on the power operated shaft 32. A detailed description of the mounting of member 36 to shaft 32 may be found in applicant's above mentioned United States application.

Member 36 displays, at one end thereof, a pair of spring rods 38 and 40 extending lengthwise of the body. These rods are mounted to an end plate 42 of the rigid member 36 by means of fastening nuts 44, 46 and 48. Nut 44 together with bolt 49 secure plate 42 to member 36.

The attachment assembly also consists of a pair of guides 50 and 52 which are fixedly mounted to a plate 51 pivotally mounted, through axis 57, to element 28 forming part of the movable structure of the bench saw. This element 28, which is also used for the mounting of the splitter 20, is thus the only part of the conventional bench saw which requires to be modified to embody the present invention; indeed, a hole is pierced in this plate to receive the axis 57.

Figure 4:
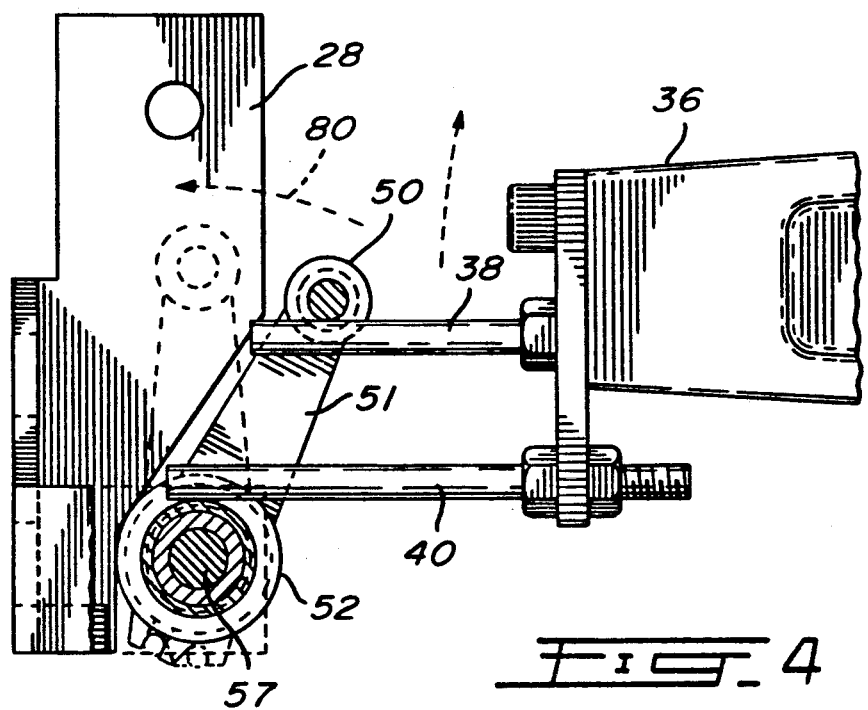
FIG. 4 is an elevational view showing the projecting rods engaged in the pins of the attachment assembly.
Figure 5:
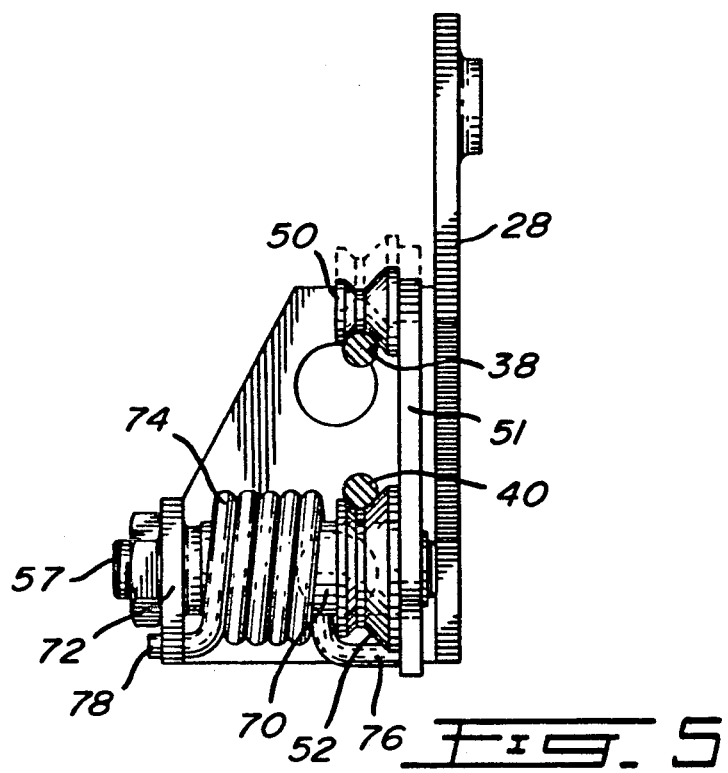
FIG. 5 is a side view of the components shown in FIG. 4.

Referring to FIGS. 4 and 5, guide 52 is mounted on a sleeve 70 contained between the lower part of plate 51 and an end wall 72 and over which is helically wound a coil spring 74 having its opposite ends 76 and 78 respectively engaged in plate 51 and wall 72. This spring 74 is tensioned so as to force plate 51 in the inclined position shown in FIG. 4 wherein rods 38 and 40 are confined in the grooves of the respective pins 50 and 52.

In the embodiment illustrated in FIG. 2, the attachment assembly is structured for a scoring saw assembly which includes a main saw blade 53 mounted on shaft 32, a scoring saw blade 54 mounted for rotation about a fixed axis 56 and an idler-belt tensioning pulley 58 mounted for rotation about a fixed axis 60. The axes 56 and 60 are parallel to one another as well as to the main shaft 32; these axes are defined by shafts mounted at an end of the rigid member 36 which is opposite to the end plate 42. An endless belt 62 transmits rotation from a pulley 64 mounted on the main shaft 32 to the pulley 58 and engages an element 66 mounted on axis 56 for rotating the scoring saw blade 54 in a direction opposite to that of blade 53. The position of the axis of pulley 58 is adjustable relative to the fixed axis 60 by appropriate means, such an eccentric; to allow for elongation variations in the belt 62.

Figure 3:
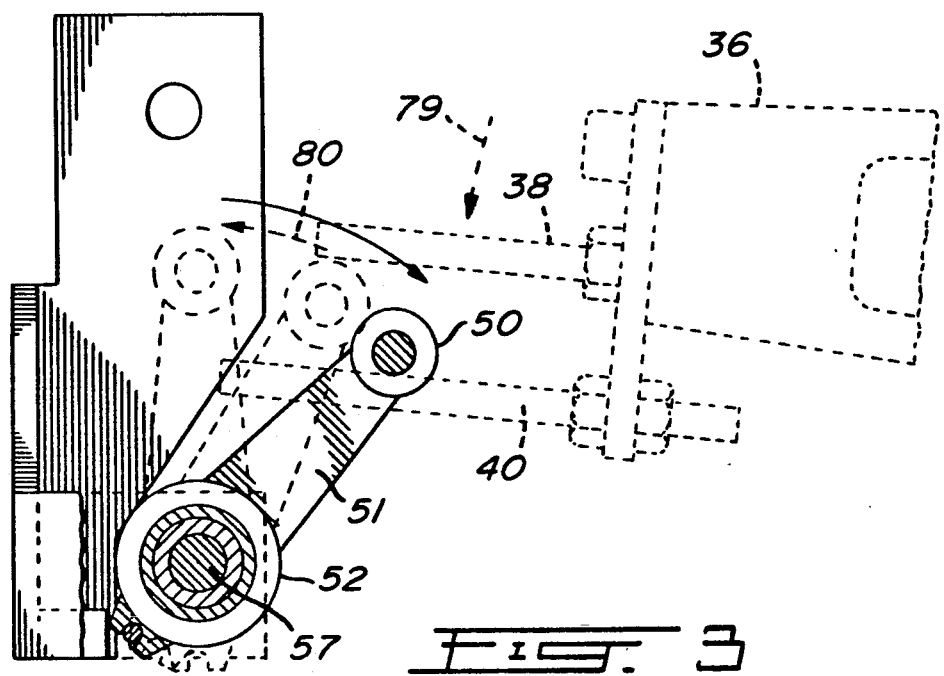
FIG. 3 is an enlarged cross-sectional view showing various positions of the spring biased plate.

To mount the attachment, the rigid member 36 is placed on shaft 32 as well as nut 33; then, referring to FIG. 3, member 36 is rotated in the direction of arrow 79. Plate 51 is then forced (or rotated counterclockwise) manually against the action of spring 74 in the direction of arrow 80 until rod 40 rests on pin 52. Then, plate 51 is released whereas, under the action of spring 74, plate 51 rotates clockwise to reach the inclined position of FIG. 4 wherein guide 50 applies downward contact pressure on rod 38. The tension in the spring must be sufficient to securely maintain the rigid member in fixed condition during a cutting operation.

The rigid member 36 is therefore fixed at three points of contact: on shaft 32, on guide 50 and on guide 52. However, the configuration of the rods and that of the grooved pins is such as to enable a sliding cooperation therebetween.

To dismount the attachment, the reverse operation is carried out.

Although the invention has been described above in relation to a specific form, it will be evident to a person skilled in the art that it may be modified and refined in various ways. For example, the attachment assembly may also be used with other types of cutting tools, such as a milled cutter, a jig saw, a press drill, etc. as illustrated in applicant's above mentioned Canadian patent application. It is therefore wished to have it understood that the present invention should not be limited in scope, except by the terms of the following claims.

The embodiments of the invention in which an exclusive property or privilege is claimed are defined as follows:

1. An attachment assembly for mounting to a conventional bench saw having: a base, a work-supporting table on said base displaying a longitudinal opening therethrough, a movable structure mounted in said base and carrying a power-operated main shaft, a cutting tool operatively connected to said shaft and partially protruding through said opening, and means in said base for causing vertical and angular displacements of said shaft relative to said table; said attachment assembly comprising:

a rigid member associated with said tool and rotatively mounted to said main shaft; said member extending longitudinally of said opening beneath said table; projection means at one end of said member; and securing means mounted to said movable structure to engage and to disengage said projection means; said securing means being movable between a first position whereby said projection means are free from engagement with said securing means, and a second position whereby said member is fixedly connected to said movable structure when said tool is set for a cutting operation to thereby prevent vertical, lateral and angular movements of said member caused by forces exerted during the cutting operation.

2. An attachment assembly as defined in claim 1, wherein said securing means are spring biased from said first position to said second position.

3. An attachment assembly as defined in claim 2, wherein said projection means consist of a pair of rods longitudinally extending from said one end of said member and wherein said securing means consist of a pair of guides respectively receiving thereon each of said rods.

4. An attachment assembly as defined in claim 3, wherein said guides have grooved walls so shaped as to correspondingly receive said rods; said pins having axes extending parallel to one another and perpendicular to axes of their corresponding rods.

5. An attachment assembly as defined in claim 3, wherein said guides are mounted on a plate pivotable relative to said member; said securing means further including a coil spring having one end fixed to said plate and an opposite end fixed to said movable member, said spring urging said plate to a rod engaging position.

6. An attachment assembly a defined in claim 1, wherein said tool is a scoring saw assembly consisting of a main saw blade mounted on said main shaft and a scoring saw blade mounted on said rigid member at an end opposite to said one end; said scoring saw blade being mounted on a shaft parallel to that of said main shaft; said member carrying an idler belt tensioning pulley rotatably mounted about a fixed shaft, axes of both said scoring blade shaft and of said pulley shaft extending parallel to an axis of said main saw blade shaft; an endless belt operatively connected between said main shaft and said pulley shaft and engaging said scoring saw blade shaft for rotational movement thereof in a direction opposite to that of said main shaft.

* * * * *